United States Patent [19]
Ernens

[11] Patent Number: 6,095,780
[45] Date of Patent: Aug. 1, 2000

[54] DEVICE FOR SEALING A ROTOR SHAFT AND SCREW-TYPE COMPRESSOR PROVIDED WITH SUCH A DEVICE

[75] Inventor: Philippe Ernens, Aubel, Belgium

[73] Assignee: Atlas Copco Airpower, Naamloze Vennootschap, Belgium

[21] Appl. No.: 09/021,123

[22] Filed: Feb. 10, 1998

[30] Foreign Application Priority Data

Feb. 12, 1997 [BE] Belgium ............................... 09700127

[51] Int. Cl.[7] .................................................. F01C 19/00
[52] U.S. Cl. .......................... 418/104; 418/201.1; 418/97; 277/351; 277/430; 277/562; 277/565; 277/551
[58] Field of Search ................................ 418/104, 201.1, 418/97; 277/351, 430, 562, 565, 551

[56] References Cited

U.S. PATENT DOCUMENTS

| | | | |
|---|---|---|---|
| 3,656,824 | 4/1972 | Ullberg | 277/66 |
| 4,781,553 | 11/1988 | Nomura et al. | 418/104 |
| 4,819,949 | 4/1989 | Otto | 277/29 |
| 5,626,345 | 5/1997 | Wallace | 277/1 |
| 5,836,753 | 11/1998 | Takei et al. | 418/95 |

FOREIGN PATENT DOCUMENTS

| | | |
|---|---|---|
| 2740161 | 3/1978 | Germany . |
| 3616689 | 11/1987 | Germany . |
| WO 94/15100 | 7/1994 | WIPO . |

Primary Examiner—Thomas Denion
Assistant Examiner—Theresa Trieu
Attorney, Agent, or Firm—Bacon & Thomas PLLC

[57] ABSTRACT

A device is provided for sealing a rotor shaft supported on a bearing mounted in a housing of an appliance for compressing or expanding a fluid containing, apart from the housing, at least one rotor mounted therein. The sealing device is situated between the rotor and the bearing around the rotor shaft and includes at least two zero contact or frictionless seals. The sealing device successively includes between the rotor and the bearing a first zero contact seal; a double, reverse lip seal with two lips; and a second zero contact seal. The two lips are partly directed towards one another and partly directed towards the rotor shaft along their backsides. An entry for fluid under pressure opens between the lips, whereby the lips, depending on the pressure between them, are in contact with to the rotor shaft or are lifted from the rotor shaft.

18 Claims, 3 Drawing Sheets

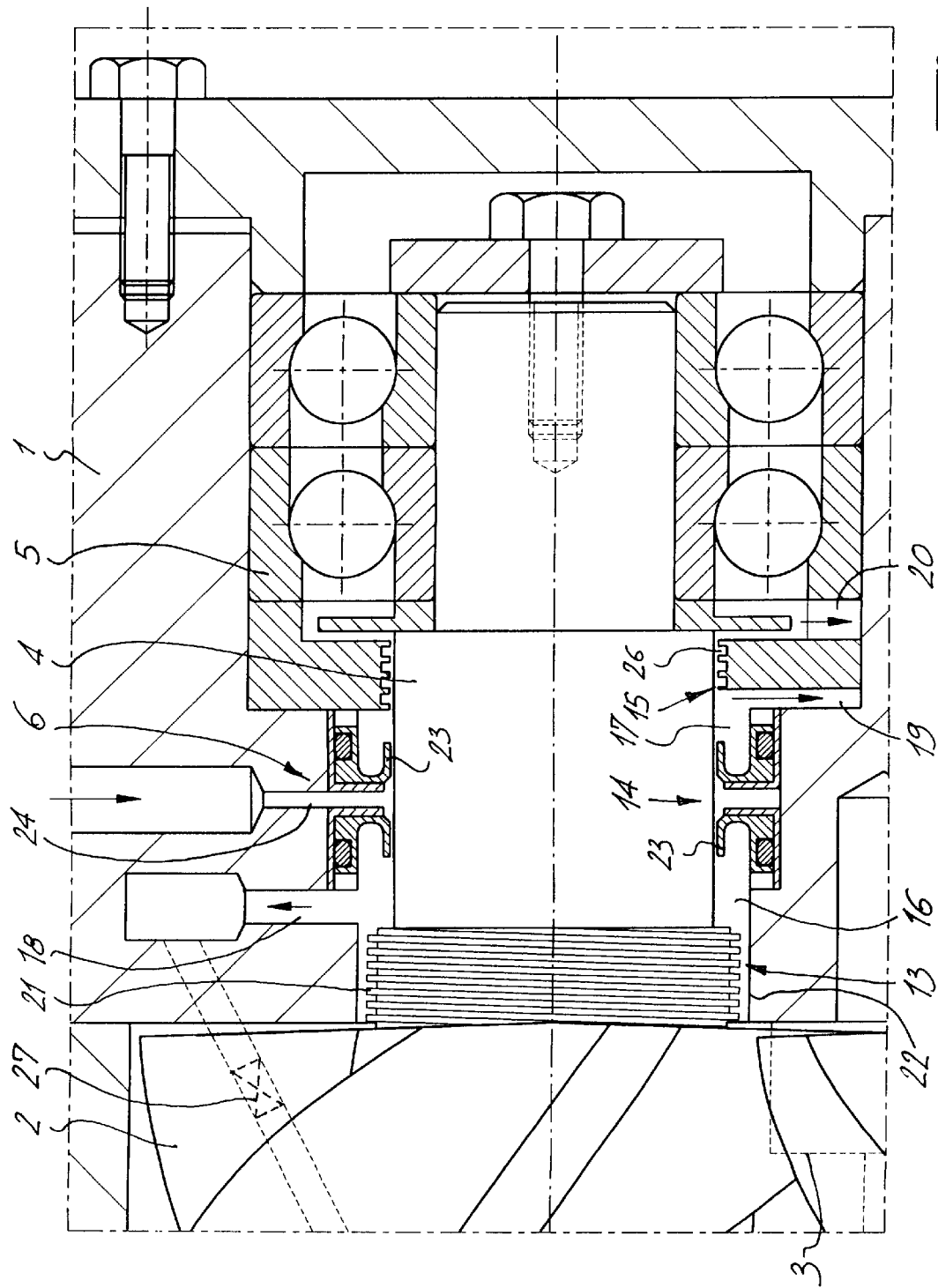

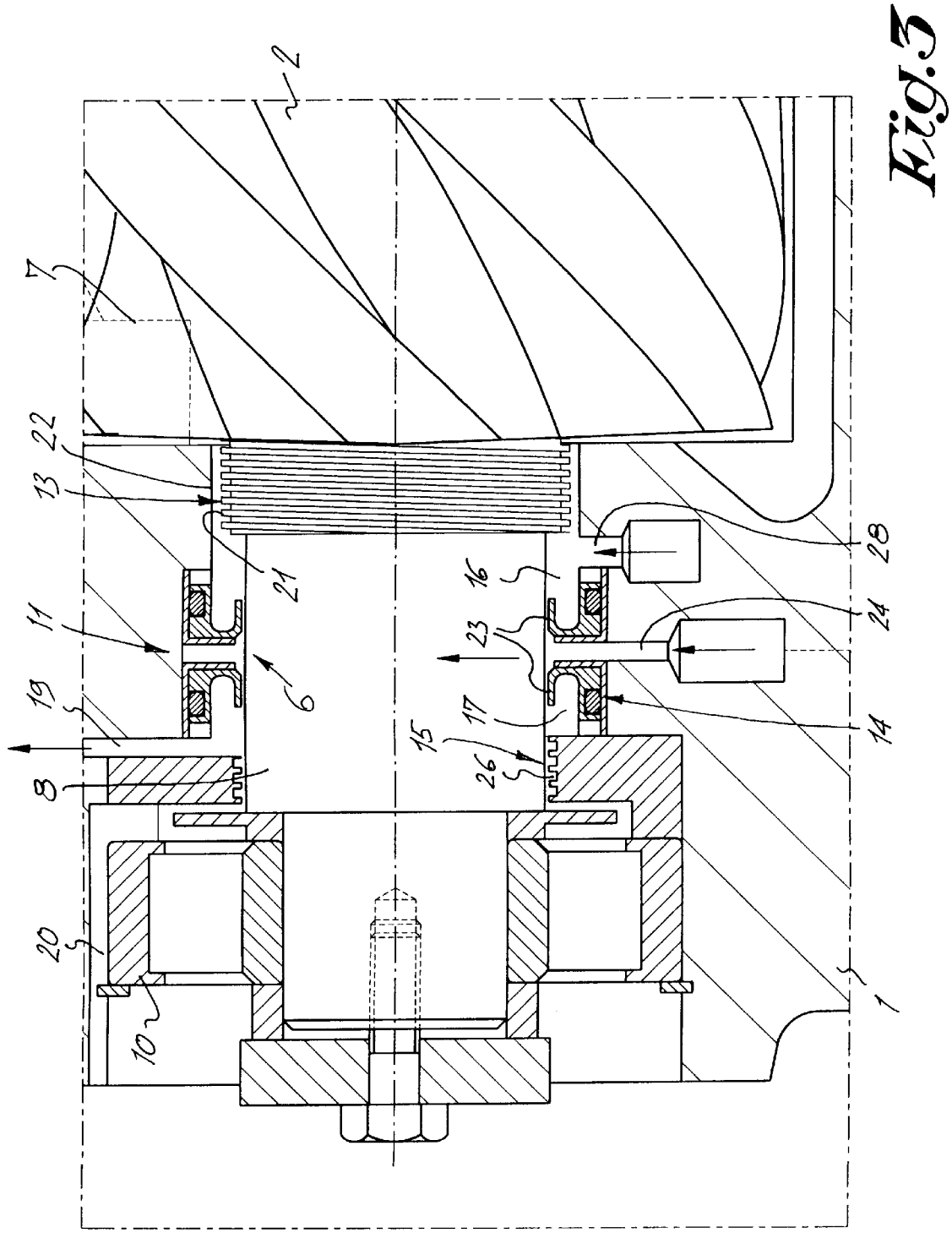

ND SCREW-TYPE COMPRESSOR
DEVICE FOR SEALING A ROTOR SHAFT AND SCREW-TYPE COMPRESSOR PROVIDED WITH SUCH A DEVICE

BACKGROUND OF THE INVENTION

1. Field of the Invention

The present invention concerns a device for sealing a rotor shaft supported on a bearing mounted in the housing of an appliance for compressing or expanding a fluid, in particular a compressor or a tube expander of the type containing a housing and at least one rotor mounted therein, whereby the sealing device is situated between the rotor and the bearing around the rotor shaft and comprises at least two zero contact or frictionless seals.

2. Description of the Related Art

It is clear that a leak at the rotor shaft reduces the efficiency of such an appliance, but in some cases lubricant from the bearings, usually oil, ending up in the fluid of the appliance or fluid from the appliance ending up in the lubricant of the bearing represents an even greater disadvantage.

This is, for example, the case with compressors in which the bearings are lubricated with oil and oil-free compressed air is required.

With liquid-injected compressors, a lubricant is sprayed on the rotors which, in order to obtain such oil-free compressed gas, is not oil but, for example, water. Moreover, this lubricant must come into contact with the bearings or the oil for lubricating these bearings.

That is why in compressors and other appliances, devices for sealing a rotor shaft are applied which comprise several seals to guarantee an optimal sealing between the rotor and the bearing of the rotor shaft, both when the rotor is at rest and when it is rotating.

A screw-type compressor is described in WO 94/15100 which is equipped with devices for sealing the rotor shafts. Most devices consist of three zero contact seals with a ring-shaped chamber between the first and the second seal connecting to an output and a ring-shaped chamber between the second and the third seal onto which a compressed-air line is connected.

However, these known sealing devices do not provide a perfect sealing.

SUMMARY OF THE INVENTION

The invention aims towards a device for sealing a rotor shaft with a relatively simple and compact design and which is inexpensive, but which most of all provides a good sealing especially in case of large pressure differences, both when the rotor shaft is at rest or when it is rotating.

This aim is reached according to the invention in that the sealing device successively includes a first zero contact seal between the rotor and the bearing; a double, reverse lip seal with two lips, partly directed towards one another and partly directed towards the rotor shaft with their backsides, and with an entry for fluid under pressure opening between the lips, whereby the lips, depending on the pressure between them, are engaged with the rotor shaft or are lifted from the rotor shaft; and a second zero contact seal.

A reverse lip seal in which the unloaded lip elastically contacts the rotor shaft but upon which a larger total pressure is exerted on the backside by the fluid from the compressor during the rotation of the rotor shaft than on the other side so that the lip is lied is described in DE-C-3,616,689.

As the lip is lied, the friction of the lip against the rotor shaft is eliminated. The lip will then expressly allow for a restricted leak of fluid under pressure.

So, this is the reverse of a normal lip seal whereby the pressure of the compressor is exerted on the front side and whereby the lip is pressed more strongly against the rotor shaft as the rotor shaft begins to turn faster and the pressure in the compressor increases, which results in greater wear.

In a compressor, this fluid preferably comes from the compressor itself and the above-mentioned entry for fluid under pressure is then connected to a high-pressure side of the compressor or an outlet thereof, for example, a separator connected to the compressor.

Each of the zero contact seals may be a labyrinth seal or a visco seal, for example, a spiral seal.

The sealing device may be situated around the rotor shaft on the high-pressure side of the rotor, in which case it may have an outlet between the first zero contact seal and the double, reverse lip seal for discharging fluid coming from around the rotor and leaking through the first zero contact seal.

The sealing device may be situated around the rotor shaft on a low-pressure side of the rotor, in which case it may have an entry between the first zero contact seal and the double, reverse lip seal for supplying fluid which is identical to or compatible with the lubricant injected in the housing.

The device may have an output for the lubricant of the bearing between the second zero contact seal and the bearing in the housing, whereas it may have a connection to the atmosphere between the lip seal and the second zero contact seal.

The invention also concerns a screw-type compressor containing two rotors in the shape of screws with rotor shafts on both ends which are bearing-mounted in the housing, most of all such a screw-type compressor in which water or any other lubricant except oil is sprayed on the rotors. The compressor contains at least one device for sealing a rotor shaft according to any of the preceding embodiments.

BRIEF DESCRIPTION OF THE DRAWINGS

In order to better explain the characteristics of the invention, the following preferred embodiment of a screw-type compressor provided with preferred embodiments of devices for sealing the rotor shaft according to the invention is described as an example only without being limitative in any way, with reference to the accompanying drawings, in which:

FIG. 2 shows the part which is indicated by F2 in FIG. 1 to a larger scale; and

FIG. 3 shows the part which is indicated by F3 in FIG. 1 to a larger scale.

DETAILED DESCRIPTION OF THE PREFERRED EMBODIMENTS

Figure 1:
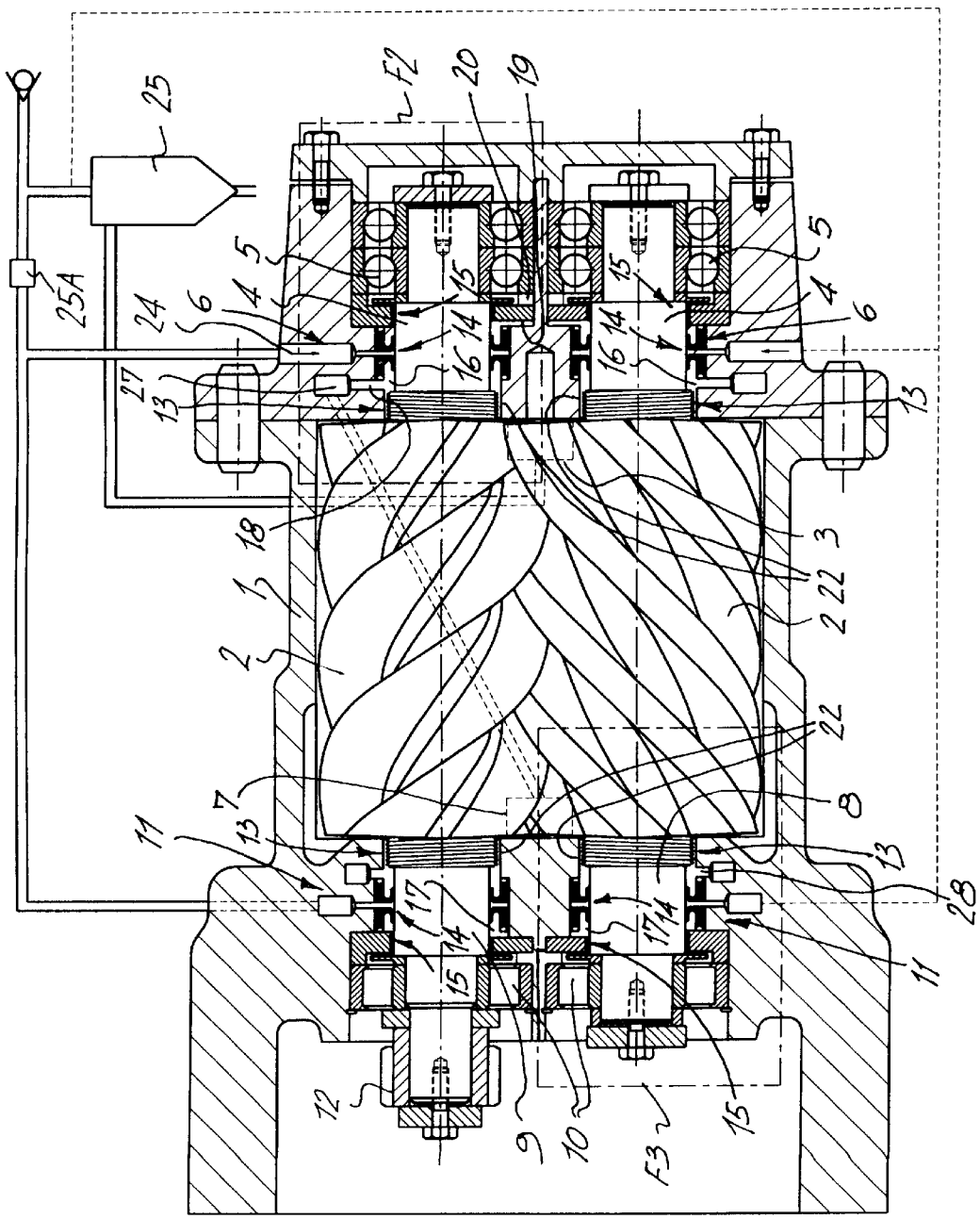
FIG. 1 schematically represents a section of a screw-type compressor according to the invention.

FIG. 1 represents a screw-type compressor with water injection which comprises a housing 1 in which two cooperating helical rotors 2 are bearing-mounted.

In front of a respective bearing, rotors 2 are each provided with an axially directed rotor shaft 4 which is bearing-mounted in a double ball bearing 5 in housing 1 on a high-pressure side of rotors 2, i.e. on the side of a compressor outlet 3.

Between rotor 2 and ball bearing 5, a first sealing device 6 is provided around rotor shaft 4.

On a low-pressure side of rotors 2 and thus on the side of a compressor inlet 7, each rotor 2 is also provided with an axial rotor shaft 8 or 9, whereby rotor shafts 8 and 9 are bearing-mounted in a respective roller bearing 10 provided in housing 1.

Between rotor 2 and roller bearing 10, rotor shaft 8 or 9 is surrounded by a second sealing device 11.

Rotor shaft 9 is slightly longer than rotor shaft 8 and has on its end which protrudes outside roller bearing 10 a gear wheel 12 which is part of a gear wheel transmission, not represented in the figures, which is contained in a gear-case formed by a part of housing 1 and connected to a driving motor.

Each sealing device 6 providing a sealing around rotor shaft 4 comprises, as is represented in detail in FIG. 2, three seals 13, 14 and 15 with ring-shaped chambers 16 and 17 in between them, onto which an outlet 18 and a connection 19 to the atmosphere are respectively connected, and a lubricant outlet 20 is connected to ball bearing 5 adjacent third seal 15.

First seal 13 on the side of rotor 2 is a zero contact dynamic seal which is formed, in the example represented, of a spiral seal and comprises a helical thread 21 which is provided on an outside of rotor shaft 4 and reaches almost up to a wall of a shaft opening 22 in housing 1. The screw direction of thread 21 is such that thread 21, in the normal sense of rotation of rotor shaft 4, carries fluid to rotor 2.

Outlet 18 is an outlet for injected fluid, namely water and air, and comprises a duct which connects chamber 16 around rotor shaft 4 to compressor inlet 7.

Connection 19 is a duct which provides a connection between chamber 17 around rotor shaft 4 and the atmosphere.

Lip seal 14 situated between chambers 16 and 17 is a double, reverse lip seal having two lips 23 and an entry 24 for compressed air opening between lips 23.

In shaft opening 22, lips 23 are partly directed towards one another and partly directed towards rotor shaft 4 with their backsides. When resting, flexible ends of lips 23 are in contact with rotor shaft 4 with their backsides.

The frontsides of lips 23 open into chambers 16 and 17, respectively, whereas entry 24 for compressed air is a duct which opens into the space between lips 23 on the one hand and which connects to a separator 25 connected to compressor outlet 3 via a pressure reducing valve 25A on the other hand. This barrier air has a light excess pressure which may be, for example, 1 bar.

Lips 23 are made of elastic, deformable material such as rubber and are fixed in a support such that the bending of the above mentioned flexible ends is not hindered.

Third seal 15 is a dynamic zero contact seal and in the example shown is a spiral seal comprising a helical groove 26 provided around rotor shaft 4 with a screw direction opposite to the screw direction of thread 21 such that when rotor shaft 4 rotates in the normal direction, fluid is pressed back to ball bearing 10.

The working of first sealing device 6 is as follows.

Under normal working conditions of the compressor, there is a large pressure on the ends of each rotor shaft 4 connected to rotor 2 so that lubricant injected on rotor 2, i.e. water, will leak under pressure via rotor shaft 4.

Thanks to first zero contact seal 13, the leaking water will be largely carried back to rotor 2. What remains of the leak flows back to compressor inlet 7 via outlet 18.

Double reverse lip seal 14 provides for the actual separation of the water and the oil with which ball bearing 5 is lubricated.

The barrier air coming from separator 25 and supplied between lips 23 via entry 24 has a larger pressure than the pressure of the oil and the pressure of the water. As a result, the flexible ends of lips 23 are lifted and thus no longer make any contact with rotor shaft 4. Due to connection 19 of chamber 17 with the atmosphere, the pressure on the side of ball bearing 5 is practically equal to this atmospheric pressure.

As a result, there is no friction of lips 23 against rotor shaft 4, but a small leak of barrier air is created. This leaking barrier air is partly eliminated via outlet 18 to compressor inlet 7 and partly via connection 19 to the atmosphere.

On the side of ball bearing 5 of lip seal 14, the atmospheric pressure prevails as chamber 17 is in connection with the atmosphere via connection 19. The other side of lip seal 14 is connected to compressor inlet 7, where the atmospheric pressure may also prevail.

Second zero contact seal 15 makes sure that oil leaking from ball bearing 5 via rotor shaft 4 is carried back to ball bearing 5.

Oil which might possibly get past second zero contact seal 15 is in any case stopped by the leaking compressed air at lip seal 14, just as water which might get past first zero contact seal 13 is stopped.

When the compressor is idle, the pressure in separator 25 is practically equal to the atmospheric pressure. The excess pressure of the barrier air is released as well. Because the excess pressure of this compressed air between lips 23 is released, lips 23 are in contact with rotor shaft 4 so that double, reverse lip seal 14 works statically as a conventional reverse lip seal.

When the compressor is unloaded, a large underpressure is created at compressor inlet 7. In order to prevent this underpressure being transmitted via outlet 18 to sealing device 6, an underpressure seal 27 must be provided in outlet 18 which is closed at zero load of the compressor.

Second sealing device 11 providing a sealing around rotor shafts 8 and 9, which is represented in detail in FIG. 3, only differs from the above-described first sealing device 6 in that outlet 18 for water which is connected to chamber 16 between zero contact seals 13 and 14 is replaced by an inlet 28 for water and is thus connected to a water source under a small excess pressure of, for example, 0.1 bar in relation to the pressure in compressor inlet 7.

The working of second sealing device 11 is analogous to the working of first sealing device 6, with the difference that no water will leak from the side of rotor 2 and that, because of first zero contact seal 13, water supplied via inlet 28 is carried to rotor 2 under a light excess pressure.

The water supplied under a light excess pressure via inlet 28 does not have any influence whatsoever on the working of lip seal 14 because the pressure of the water is considerably lower than the pressure of the barrier air supplied to lip seal 14.

The abovedescribed sealing devices 6 and 11 provide excellent sealing and perfect separation between the lubricant of rotors 2 and that of bearings 5 and 10.

In sealing devices 6 and 11, zero contact seals other than those described above may be used, such as other visco seals or labyrinth seals.

Also a lubricant other than water may be injected in the compressor.

Entry 24 of lip seal 14 does not necessarily need to be connected to a source of barrier air under pressure either. Instead of barrier air, other fluids under pressure may be used.

Sealing devices 6 and 11 may also be applied to other types of compressors and even to other appliances for compressing or expanding fluids, such as tube expanders and pumps.

The present invention is by no means limited to the above-described embodiments represented in the accompanying drawings; on the contrary, such a sealing device and such a screw-type compressor may be made in all sorts of variants while still remaining within the scope of the invention.

I claim:

1. A device for sealing a rotor shaft which is supported on a bearing mounted in a housing of an appliance for compressing or expanding a fluid including at least one rotor mounted therein, said sealing device comprising:
    a first zero contact seal;
    a double, reverse lip seal having two lips with backsides and an entry for fluid under pressure opening between said lips, said lips partly directed towards one another and partly directed towards said rotor shaft with said backsides, said lips being in contact with or lifted from said rotor shaft depending on an amount of pressure between said lips; and
    a second zero contact seal;
        wherein said seals are successively situated along and around a rotor shaft between a rotor and a bearing.

2. A sealing device according to claim 1, wherein said rotor shaft is that of a compressor having a high-pressure side and wherein said entry for fluid under pressure is connected to said high-pressure side of said compressor.

3. A sealing device according to claim 1, wherein said rotor shaft is that of a compressor having an outlet and wherein said entry for fluid under pressure is connected to said outlet of said compressor.

4. A sealing device according to claim 1, wherein at least one of said zero contact seals is selected from the group consisting of a labyrinth seal, a spiral seal and a visco seal.

5. A sealing device according to claim 1, further comprising:
    a lubricant outlet for lubricant of said bearing which is located between said second zero contact seal and said bearing.

6. A sealing device according to claim 1, further comprising:
    an outlet between said first zero contact seal and said double, reverse lip seal for discharging fluid leaking through said first zero contact seal from around said rotor; and wherein said sealing device is situated around said rotor shaft on a high-pressure side of said rotor.

7. A sealing device according to claim 6, further comprising:
    a ring-shaped chamber around said rotor shaft between said first zero contact seal and said double, reverse lip seal, said ring-shaped chamber being connected to said outlet.

8. A sealing device according to claim 1, further comprising:
    an inlet for supplying fluid between said first zero contact seal and said double, reverse lip seal; and wherein said sealing device is situated around said rotor shaft on a low-pressure side of said rotor.

9. A sealing device according to claim 8, further comprising:
    a ring-shaped chamber around said rotor shaft between said first zero contact seal and said double, reverse seal, said ring-shaped chamber being connected to said inlet.

10. A sealing device according to claim 1, further comprising:
    a connection to the atmosphere between said double, reverse lip seal and said second zero contact seal.

11. A sealing device according to claim 10, further comprising:
    a ring-shaped chamber around said rotor shaft between said double, reverse lip said and said second zero contact seal, said ring-shaped chamber being connected to said connection to the atmosphere.

12. A screw-typed compressor, comprising:
    a housing;
    two helical rotors with respective ends;
    a rotor shaft mounted on each of said ends of said rotors, said rotor shafts being bearing-mounted in said housing; and
    at least one sealing device including a first zero contact seal, a double, reverse lip seal and a second zero contact seal successively situated around one of said rotor shafts between a rotor on said one of said rotor shafts and a respective bearing, wherein said double, reverse lip seal has two lips with backsides and an entry for fluid under pressure opening between said lips, said lips being partly directed towards one another and partly directed towards said one of said rotor shafts with said backsides, said lips being in contact with or lifted from said one of said rotor shafts depending on an amount of pressure between said lips.

13. A compressor according to claim 12, further comprising:
    a compressor inlet in said housing;
    a high-pressure side of said compressor on which said sealing device is located; and
    an outlet of said sealing device located between said first zero contact seal and said double, reverse lip seal, said outlet being connected to said compressor inlet.

14. A compressor according to claim 13, wherein said compressor is a liquid-injected compressor.

15. A compressor according to claim 12, further comprising:
   a low-pressure side of said compressor on which said sealing device is located; and
   an inlet of said sealing device located between said first zero contact seal and said double, reverse seal, said inlet being connected to a fluid source.

16. A compressor according to claim 15, wherein said compressor is a liquid-injected compressor.

17. A compressor according to claim 12, further comprising:
   a compressor inlet in said housing;
   a high-pressure side of said compressor on which a first sealing device is located;
   an outlet of said first sealing device located between said respective first zero contact seal and said respective double, reverse lip seal, said outlet being connected to said compressor inlet;
   a low-pressure side of said compressor on which a second sealing device is located; and
   an inlet of said second sealing device located between said respective first zero contact seal and said respective double, reverse lip seal, said inlet being connected to a fluid source.

18. A compressor according to claim 17, wherein said compressor is a liquid-injected compressor.

* * * * *